United States Patent [19]

Smilanick

[11] Patent Number: 5,431,507
[45] Date of Patent: Jul. 11, 1995

[54] BICYCLE TORQUE COUPLING

[76] Inventor: Steve Smilanick, 318 Zola Ave., Roseville, Calif. 95678

[21] Appl. No.: 89,108

[22] Filed: Jul. 12, 1993

[51] Int. Cl.$^6$ ............................................. B62K 15/00
[52] U.S. Cl. ................................... 403/307; 403/354; 403/364; 280/287; 285/913
[58] Field of Search ............... 403/364, 354, 343, 307, 403/300, 41; 280/287, 278; 285/913, 354, 276

[56] References Cited

U.S. PATENT DOCUMENTS

| | | | |
|---|---|---|---|
| 349,678 | 9/1886 | Applegate | 403/300 |
| 717,684 | 1/1903 | Humphreys | 280/287 |
| 2,094,416 | 9/1937 | Sheffield | 403/307 |
| 2,447,956 | 8/1948 | Morders | 280/287 |
| 2,549,264 | 4/1951 | Timmins | 285/354 |
| 3,304,099 | 2/1967 | Jankowski . | |
| 3,463,228 | 8/1969 | Hearn . | |
| 3,623,753 | 11/1971 | Henry | 403/364 |
| 4,053,248 | 10/1977 | Schultenkamper et al. . | |
| 4,099,745 | 7/1978 | Cobbs | 403/307 |
| 4,252,335 | 2/1981 | Brenner | 280/287 |
| 4,462,606 | 7/1984 | Hon . | |

FOREIGN PATENT DOCUMENTS

| | | | |
|---|---|---|---|
| 992681 | 10/1951 | France | 280/287 |
| 707858 | 6/1966 | Italy | 280/287 |

OTHER PUBLICATIONS

Spacesavers advertisement for a Folding 18–Speed Mountain Bike, 1 page, undated.

*Primary Examiner*—Edward K. Look
*Assistant Examiner*—James A. Larson
*Attorney, Agent, or Firm*—Bernhard Kreten

[57] ABSTRACT

A torque transmitting, bicycle frame coupling which connects to the frame tubes, replacing a portion of those tubes and having teeth on their engaging faces. Proper installation of two such couplings allows up to a 25 inch men's style bicycle with up to 700C (26 inch rim diameter) wheels to be cut in two pieces so that it fits in a suitcase with a combined height, width and girth measurement no larger than 62 linear inches and then be put back together with no loss of original frame geometry or stiffness. Each coupling is actuated, pulling the bicycle pieces together and joining them through use of specialized teeth under compression by a threaded lug, a removable-shoulder lug with a removable shoulder and a threaded coupling nut. The removable shoulder makes the nut and shoulder replaceable, and makes possible an additional shoulder on the tube connecting end of the removable-shoulder lug to keep the nut from slipping onto the frame and scratching the paint.

30 Claims, 3 Drawing Sheets

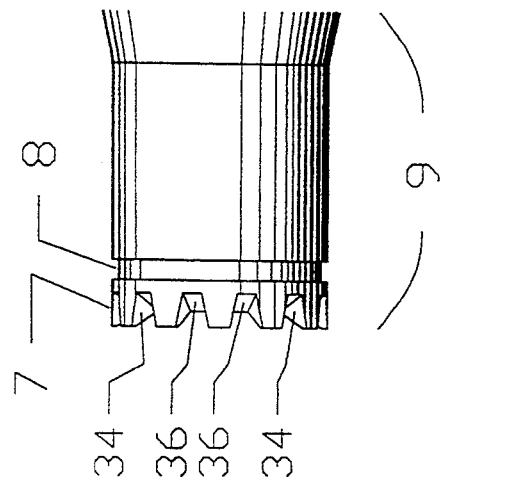
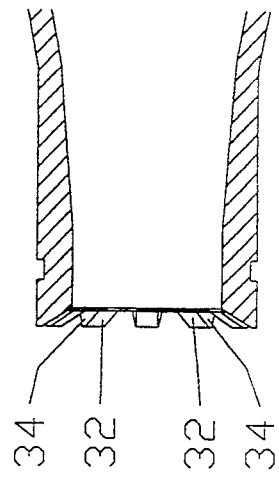
FIG. 1A
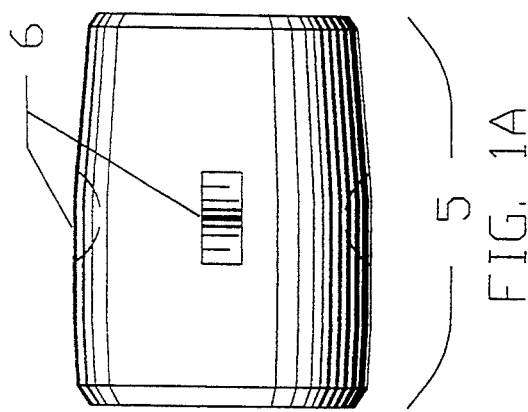
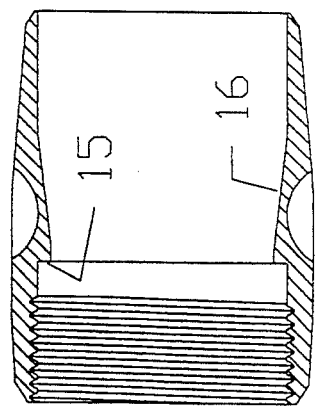
FIG. 3A
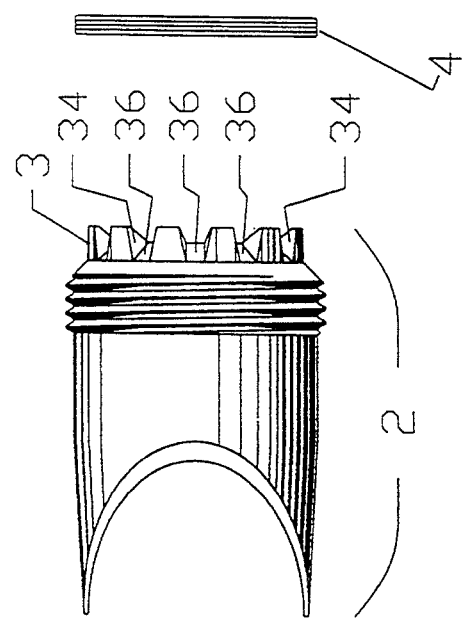
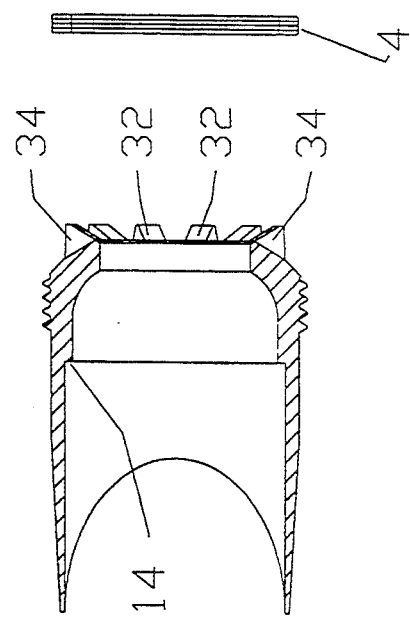

BICYCLE TORQUE COUPLING

BACKGROUND OF THE INVENTION

For many years bicycles have been made to fold or break down for storage and transportation purposes. Many are adequate for the two preceding purposes, but they lack the ride and style desired by avid cyclists. The invention in question combines all the best time proven features of a bicycle with the added feature of being able to take the frame apart to fit in a suitcase.

SUMMARY OF THE INVENTION

The invention is a coupling to join bicycle frame tubes end to end with minimal weight addition, while preserving the original geometry and stiffness of the frame. The coupling has two lugs that join together with a coupling nut and replaces a small segment of tubing cut from the original frame. Both lugs have inner faces cut with clutch teeth that interlock when the coupling nut pulls them together. The design is compact, light and strong. If two such couplings are properly installed, a men's style, 25 inch bicycle with 700C (26 inch rim diameter) wheels can be broken down to fit in a suitcase whose height, width and girth measurements total no more than 62 linear inches, and can, furthermore, be reassembled to yield a bicycle that rides exactly like the original, with no loss of the original frame geometry or stiffness, two things which are very important to avid cyclists.

BRIEF DESCRIPTION OF THE DRAWINGS

The six views shown contain the invention and its relative relationship with the tubes it is installed on and the special method of marking the frame for proper installation.

FIG. 1A is a detail of a portion of that which is shown in FIG. 1.

FIG. 3A is a detail of a portion of that which is shown in FIG. 3.

DETAILED DESCRIPTION OF THE INVENTION

Figure 1:
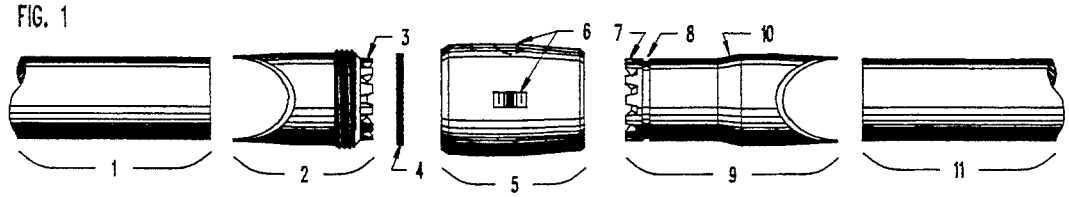
FIG. 1 is a component view showing the order of placement of the individual parts in the working invention with external threads, grooves, shoulders, slots, teeth, and a removable shoulder.
Figure 2:
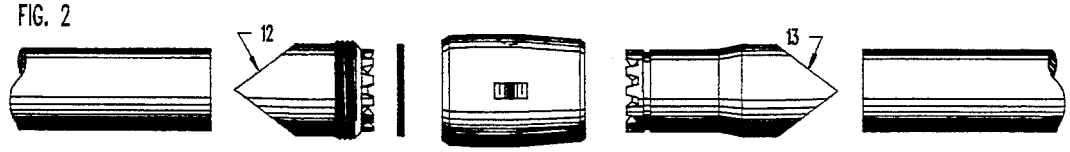
FIG. 2 is a view of FIG. 1 turned 90 degrees axially.
Figure 3:
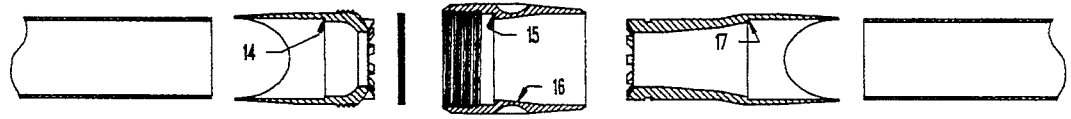
FIG. 3 is section view of FIG. 1 additionally showing bores, internal shoulders, tapers and threads.
Figure 4:
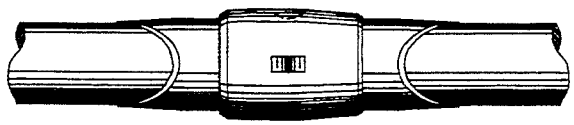
FIG. 4 is an assembly view.
Figure 5:
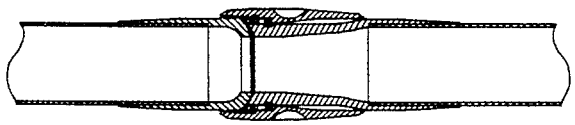
FIG. 5 is a section view of FIG. 4.

The coupling comprises a threaded lug (2) a removable-shoulder lug (9), a coupling nut (5) and a removable shoulder (4) with a means to attach it (8) on the removable shoulder lug. The lugs are bored to fit over the frame tube ends (1 and 11) up to inner shoulders (14 and 17) and have truncated, tapered clutch teeth (3 and 7) cut on their mating faces.

The teeth on each part are radially oriented with tapered sides, tops and grooves; the tops and grooves made so that lines running along the planar bottom surfaces of the grooves between the teeth and extending beyond the planar bottom surfaces will share a common imaginary point on the polar axis outside the toothed end of the coupling part, the tops of the teeth on a side of the teeth facing the opposite mating face being cut with the exact opposite angle with respect to a plane in which the mating faces abut. This produces teeth that allow full contact on all sides between the tops and the grooves, when meshed together. Truncation of such teeth further prevents them from bottoming out in the mating groove of the opposing part, eliminating all backlash when the coupling nut (5) is tightened. Tooth truncation also facilitates future tightening to compensate for wear through repeated use.

As shown in FIGS. 1 through 3A, the teeth 3, 7 on both lugs 2, 9 are identical and are radially oriented with tapered side surfaces 34 and top surfaces 32, and with bottom gap surfaces 36 between adjacent teeth 3, 7. The tooth top surfaces 32 are oriented adjacent the bottom gap surface 36 of the opposite lug 2, 9 when the mating faces of the lugs 2, 9 are brought together. Each tooth top surface 32 is angled with an outer extent of the top surface 32, most distant from the polar axis, closer to the opposite lug 9, 2 than an inner extent of the top surface 32, closest to the polar axis. Each bottom surface 36 is angled with an inner extent of the bottom surface 36, closest to the polar axis, closer to the opposite lug 9, 2 than an outer extent of the bottom surface 36, most distant from the polar axis.

The side surfaces 34 extend between edges of each bottom gap surface 36 and edges of adjacent tooth top surfaces 32. The side surfaces 34 are angled sufficiently to cause the tooth top surfaces 32 and bottom gap surfaces 36 to be rectangular with edges of each tooth top surface 32 parallel to each other and edges of each bottom gap surface 36 parallel to each other. The tooth top surfaces 32 and bottom gap surfaces 36 are of similar widths between their respective parallel edges. The teeth/gap configuration produces teeth 3, 7 that allow full contact between side surfaces 34 of the teeth 3, 7 of the two mating faces, in a coplanar orientation, when meshed together.

To better distribute stress in the tube caused by an increase in the cross sectional area where the tubes enter the lugs, the tube accepting ends have angles (12 and 13) cut to form two points 180 degrees opposite each other, and the lugs' outer diameters taper thinner towards those points.

The coupling parts should be made from materials that will be as strong as the frame tube when machined to the desired thickness and that will allow attachment of the coupling by some means compatible with both materials, such as brazing, silver brazing, welding, adhesive bonding, etc., so the combination of tubes and couplings will transmit all normal forces acting on the bicycle frame without failure. As alloys and materials vary greatly, bicycle frame materials included, special care should be taken regarding the choice of materials, and the design, thicknesses and method of attachment.

Installation of the couplings to yield bicycle pieces that will fit the parameters of the desired suitcase first involves relative measurement of the two anticipated frame sections with respect to that suitcase's measurements (keeping in mind the size of the wheels that must fit in the case as well). This is accomplished by making two square templates the height and width of the suitcase to be used. I used 26×26 inch squares because the deflated wheels will just fit inside, leaving ten inches of girth to accommodate the thickness of the wheels and frame pieces when stacked without going over the 62 linear inch maximum for normal sized luggage. I made a special suitcase to fit those measurements as well.

Figure 6:
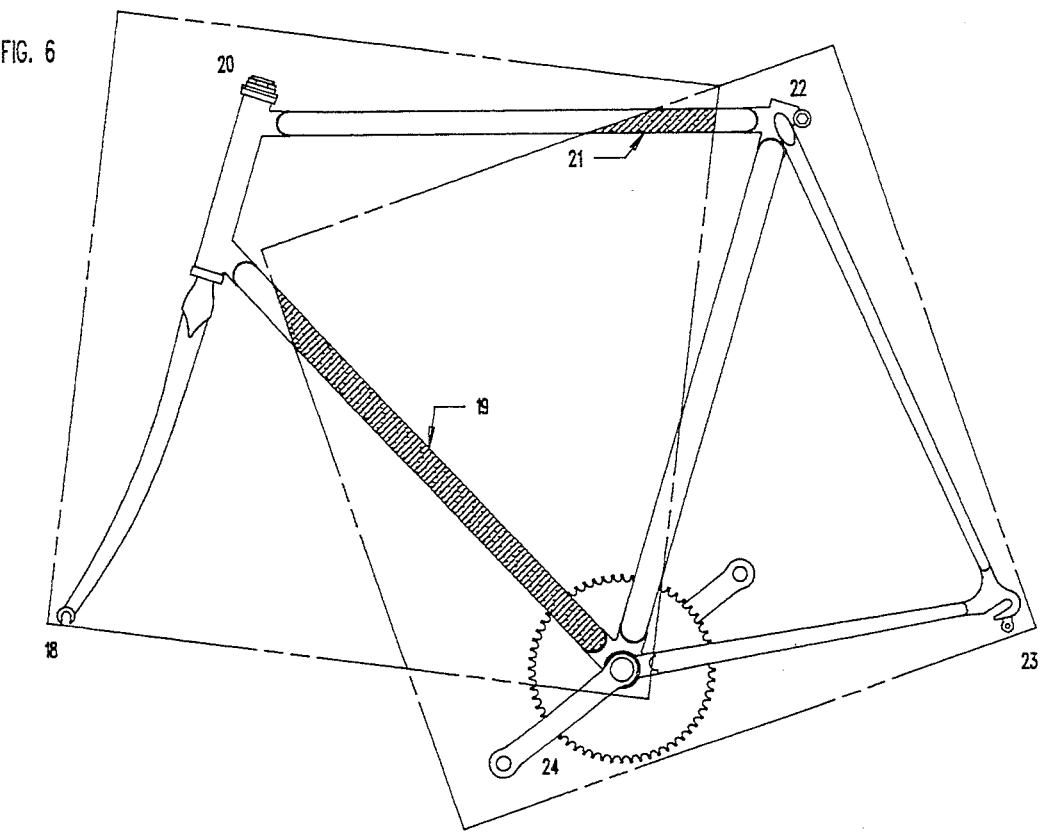
FIG. 6 is a view of the templates over the frame for marking it for cutting and placement of the couplings.

These templates must be adjusted on the front and rear anticipated sections of the bicycle until each feature that cannot or will not be removed is totally within the area defined by at least one template (see FIG. 6). This would include, but not be limited to: (inside the dotted area on the left in FIG. 6) the top of the head-set (20) the tip of the forward fork (18), and (inside the dotted area on the right in FIG. 6), the entire seat tube (22), the lowest tip of the rear wheel drop out where the derailleur connects (23), and the crank set assembly (24).

Figure 7:
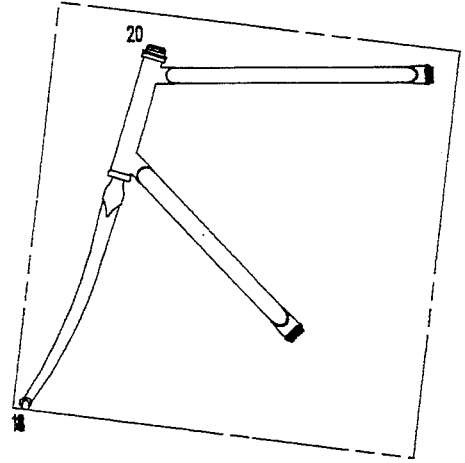
FIG. 7 is a view of the front piece of the bicycle frame from FIG. 6 with the threaded lug installed.
Figure 8:
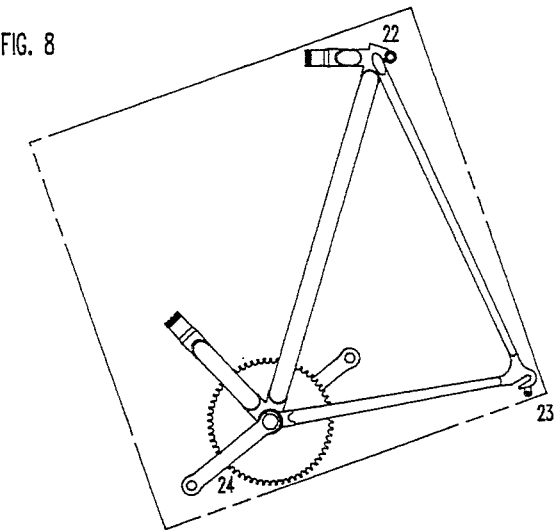
FIG. 8 is a view of the rear piece of the bicycle frame from FIG. 6 with the removable collar lug installed.

The gray areas (19 and 21) on the top and down tubes in FIG. 6 identify where the templates overlap on those tubes. This is where the couplings are to be inserted and where the center lines of the couplings must be after installation. Typically, area 21 is very small and requires exact placement of the coupling, while area 19 is quite large and will allow for much adjustment in the placement of that coupling. FIGS. 7 and 8 show the couplings installed within the overlapping areas. In this example, the threaded lugs are in FIG. 7, and the removable collar lugs are in FIG. 8. Again, note the position of the coupling center lines within the overlapping areas of the templates (the gray areas).

If there is no overlap on the top and down tubes, which will probably occur on a men's style bicycle larger than 25 inches, the center lines will not fall within both templates, and therefore, not yield a bicycle that fits in a suitcase with a total height, width and girth measurement of 62 linear inches. Though possible to have more adjustment room within the templates by removing the crank set assembly, I did not for ease of bicycle disassembly and assembly.

To preserve the original geometry of the bicycle frame, as is one intent of this invention, the exact length of tubing that will be replaced by the coupling, from inner shoulder (14) to inner shoulder (17) of the lugs (2 and 9) must be cut out, keeping in mind positions of previously brazed on lugs, cable guides, etc. that may interfere with the couplings. Repositioning or replacing some of these parts may be necessary. As before mentioned, methods of securing the lugs to the frame vary, depending on the material the lugs and frame are made of. In one case, I made the couplings from stainless steel and, therefore, silver brazed the couplings on.

Once the lugs are attached to the frame tubes, each coupling nut (5) is slid onto its mating removable-shoulder lug (9) until the removable shoulder (4) can be put on. On one coupling, I have used retaining rings in a groove, but the removable shoulder could be one of many configurations with multiple attachment methods, such as threading, set screws, slots pins, etc. The removable shoulder (4) functions with the coupling nut (5) to pull frame pieces (1 and 11) together, and because tapered shoulder (10) can be put on the removable lug (9) to meet tapered shoulder (16) in the coupling nut (5), the nut, when unscrewed, can not fall off the back side of the lug and scratch the frame paint. The nut and the removable shoulder are also replaceable if they get damaged.

During frame assembly, the coupling nut (5) threads onto the threaded lug (2) and pulls the removable-shoulder lug (9) axially by shoulder (15) of the coupling nut (5) engaging the removable shoulder (4). This interlocks the clutch teeth (3 and 7), and after tightening the coupling nut (5) with a spanner wrench in slots (6) which are cut in the nut, a force transmitting union, equal in strength or greater than that of the original tube, is formed. If the couplings teeth (3 and 7) do wear, further tightening of the coupling nut (5) will take up the backlash with a negligible change in the frame tube length.

Frame disassembly and packing involves removing the parts that could not be fit inside the parameters of the templates and the parts that restrict the bicycle from fitting inside the suit case while they are attached (in my case the wheels, pedals, seat, rear derailleur, and handlebar assembly), loosening cables, and separating the coupling lugs. The parts of the bicycle can then be adjusted to fit around each other in the desired suitcase. I put the wheels against the outside walls, and the frame pieces in the middle with the other parts intermingled. Re-assembly involves removing the pieces from the bag and putting them back together, making sure that cables are re-attached, and that all loosened parts are alligned and re-tightened for safety.

Previous Arts

There is one similar previous art in question discovered. It was filed by Richard K. Brenner in July of 1979 and awarded U.S. Pat. No. 4,252,225 in February of 1981. It was for a collapsible bicycle that used standard plumbing pipe unions, adapted to fit on three places of a bicycle. Though my invention may be used in a similar fashion to Mr. Brenner's, it is different in many pays, the most important of which are: first, my coupling uses a removable shoulder on a lug end, not a permanently fixed flanged end; second, my invention is for a coupling that has specialized clutch teeth cut onto engaging faces instead of flat surfaces, and/or one coupling using an alignment pin; third, my invention does not involve the adaptation of three, standard, off the shelf, plumbing parts to fit a bicycle. It is for a custom made, light weight, strong, aerodynamic, torque transmitting coupling of which only two are needed to adapt a bicycle for my purposes.

The removable shoulder feature of my invention adds positive things to my coupling over Mr. Brenner's. First, it allows the nut to be installed from the front of the lug so another shoulder can be cut on the rear to keep the nut from sliding off the back and scratching the frame paint. Mr. Brenner specified no such provision. A removable shoulder can also be easily replaced. The nut can as well, because it is the removable shoulder that keeps it on and not a permanently fixed flange. Mr. Brenner's coupling would require the melting of solder or cutting to be able to remove and replace the nut if damaged, or to replace the whole coupling end if the flange were damaged.

The specialized teeth on my couplings' engaging faces mesh together with zero backlash, resisting shock and torsional forces the frame might experience during use because of uneven terrain and pedaling motions. There will be no twisting. Mr. Brenner's couplings will slip and twist because the faces of his frame tube couplings are smooth. Even if the alignment pin and groove found in Mr. Brenner's steering coupling, which my invention does not include, were added to his frame tube couplings, they would still eventually twist under shock and torque because of wear. Re-machining is the only way to adjust for this. This brings up another positive feature of my coupling. Its teeth are tapered and will allow compensation for wear due to hard use by bringing them closer together through tightening of the coupling nut. The fact that the teeth can be pressed together with zero backlash also helps to prevent the coupling from wiggling and working the coupling nut loose during hard use.

The tube accepting ends of my coupling are also much improved over Mr. Brenner's. My ends taper thinner on the outer diameter towards the outside ends and are angle cut on two sides to produce points 180 degrees from each other. These two attributes allow my coupling to better distribute stresses put on the tube connection points during bicycle use. The taper gradually reduces the cross sectional area, and the angle cut spreads the intersection point of lug and tube out over a longer distance so it is not all in the same plane which lies perpendicular to the polar axis of the frame tube. Mr. Brenner's lugs were not tapered and ended bluntly on the ends.

In addition, my invention adds the novelty of being able to fit a men's style, 25 inch bicycle with 700C (26 inch rim diameter) wheels in a suit case not exceeding 62 total linear inches in height, width and girth if it is installed correctly.

What I claim is:

1. A coupling for joining bicycle frame tubes consisting of two lugs, one lug being a threaded lug and the second lug having a removable shoulder with a means to attach that shoulder to it, a coupling nut for drawing the lugs together, and a means to attach the lugs to the frame tubes, wherein the lugs have teeth cut into faces thereof which engage each other when drawn together by the coupling nut, and wherein the teeth of each lug have tops on a surface of the teeth facing the other of the two lugs, grooves between the teeth, and two sides, the sides extending between the tops and the grooves, the sides configured to have full contact between the sides of the teeth of one lug and the sides of the teeth of the opposite lug.

2. A coupling from claim 1 such that the teeth exhibit a contour which mirrors a contour of the grooves between the teeth of both lugs in both size and shape.

3. A coupling from claim 1 such that the teeth are truncated and taper-toothed, which engage each other when drawn together by the coupling nut, and wherein the grooves include a planar bottom surface exhibiting a constant width between the sides of adjacent teeth.

4. A coupling from claim 1 with a bore cut into lug ends, for the frame tube to be inserted in.

5. A coupling from claim 4 where the bore is cut in up to a shoulder in the lug ends for the frame tubes to be inserted against.

6. A coupling from claim 4 where the bore is cut in up to a shoulder in the lug ends for the frame tubes to be inserted against, the tube accepting ends being angle cut in one or more places.

7. A coupling from claim 1 wherein the coupling nut is on the second lug, the second lug including means to retain the coupling nut from sliding off the second lug onto the frame tube.

8. A coupling from claim 7 wherein the coupling nut is retained from sliding off the second lug and onto the frame tube by a shoulder on the second lug.

9. A coupling from claim 7 wherein the coupling nut is retained from sliding off the second lug and onto the frame tube by a shoulder on the removable-shoulder lug and a shoulder in the coupling nut.

10. A coupling from claim 1 such that there is a means for tightening and loosening the coupling nut on the coupling lugs.

11. A coupling from claim 1 including means for allowing a wrench to grasp the coupling nut for tightening and loosening the coupling nut on the coupling lugs.

12. A coupling from claim 1 wherein at least two of the couplings are oriented on locations of the frame tubes of a bicycle such that the bicycle can be broken down at the couplings into separate frame tube pieces and fit in a container having a height, width and girth up to 62 linear inches.

13. A coupling for joining bicycle frame tubes consisting of two lugs, one lug being a threaded lug and the second lug having a removable shoulder with a means to attach that shoulder to it, a coupling nut for drawing the lugs together, and a means to attach the lugs to the frame tubes, and wherein the lugs have truncated, taper-toothed, clutch teeth on faces thereof which engage each other when drawn together by the coupling nut, the teeth being radially oriented, grooves between the teeth being planar and tilted at like angles such that lines running along bottoms of the grooves and toward the axis of the coupling would intersect the axis at an imaginary point on the axis of the coupling beyond the face of the coupling which engages an opposite coupling face when drawn together by the coupling nut, and the tops of the teeth being cut with the exact opposite angle with respect to a plane in which the faces of the two lugs engage each other.

14. A coupling for joining bicycle frame tubes consisting of two lugs, one lug being a threaded lug and the second lug having a removable shoulder with a means to attach that shoulder to it, a coupling nut for drawing the lugs together, and a means to attach the lugs to the frame tubes, wherein a bore is cut in up to a shoulder in ends of the lug for the frame tubes to be inserted against, and the tube accepting ends being angle cut in one or more places and tapering thinner on an outer diameter towards the lug ends.

15. A connector for releasably joining ends of a bicycle frame tube together to facilitate disassembly and reassembly of a bicycle frame, the connector comprising in combination:

a first lug fixedly attachable to and overlying a first end of a first frame tube to be joined, a second lug fixedly attachable overlying a second end of a second frame tube to be joined, means to apply a compressive force compressing said first lug against said second lug, said compressive force applying means operatively coupled between said first lug and said second lug, and means to resist rotation of one of said lugs with respect to another of said lugs;

whereby said first frame tube and said second frame tube can be rigidly joined together, and wherein said compressive force applying means includes a coupling nut connected to said second lug in a manner allowing rotation therebetween, said coupling nut having an inner bore with threads thereon, and said first lug having threads on an exterior thereof complemental to said threads on said coupling nut, said second lug including a means to resist axial translation of said coupling nut completely off of said second lug and onto said second frame tube to which said second lug is attached.

16. The connector of claim 15 wherein said axial translation resisting means includes said second lug having a first shoulder with an exterior diameter greater than a portion of said inner bore of said coupling nut, whereby said coupling nut abuts said shoulder of said second lug when translated axially toward the second frame tube.

17. The connector of claim 16 wherein said axial translation resisting means includes said second lug having a second shoulder with an exterior diameter greater than a portion of said inner bore of said coupling nut, said second shoulder closer to the first frame tube than said portion of said inner bore of said coupling nut, whereby said coupling nut is prevented from translation off of said second lug.

18. The connector of claim 17 wherein said second shoulder is removably connected to said second lug.

19. A connector for releasably joining ends of a bicycle frame tube together to facilitate disassembly and reassembly of a bicycle frame, the connector comprising in combination:
   a first lug fixedly attachable to a first end of a first frame tube to be joined,
   a second lug fixedly attachable to a second end of a second frame tube to be joined,
   means to apply a compressive force compressing said first lug against said second lug, said compressive force applying means operatively coupled between said first lug and said second lug, and
   means to resist rotation of one of said lugs with respect to another of said lugs;
   whereby said first frame tube and said second frame tube can be rigidly joined together, and
   wherein each lug includes an attached edge at which said lug is fixedly attached to one of the frame tubes, said attached edge oriented non-perpendicular to a long axis of the frame tube to which said lug is attached, whereby forces applied at said attached edge are distributed somewhat along a length of the frame tube.

20. The connector of claim 19 wherein each said lug includes an exterior circumference which tapers to a lesser size as said lug extends toward said attached edge thereof, whereby said lug exhibits a lesser exterior diameter adjacent said attached edge than at other portions of said lug.

21. A connector for releasably joining ends of a bicycle frame tube together to facilitate disassembly and reassembly of a bicycle frame, the connector comprising in combination:
   a first lug fixedly attachable to a first end of a first frame tube to be joined,
   a second lug fixedly attachable to a second end of a second frame tube to be joined,
   means to apply a compressive force compressing said first lug against said second lug, said compressive force applying means operatively coupled between said first lug and said second lug, and
   means to resist rotation of one of said lugs with respect to another of said lugs;
   whereby said first frame tube and said second frame tube can be rigidly joined together, and
   wherein said rotation resisting means includes intermeshing clutch teeth formed on faces of each lug which engage each other when drawn together by the means to apply compressive force, said clutch teeth having gaps therebetween which include a bottom surface not parallel to a plane in which said faces engage each other.

22. The connector of claim 21 wherein said teeth of each lug have tops on a surface of said teeth facing the other of said two lugs, and two sides, said sides extending between said tops and said gaps, said sides configured to have full contact between said sides of said teeth of one said lug and said sides of said teeth of said opposite lug.

23. The connector of claim 22 wherein said teeth exhibit a contour which mirrors a contour of said gaps between said teeth of both lugs in both size and shape.

24. The connector of claim 23 wherein said gaps include a planar bottom surface exhibiting a constant width between said sides of adjacent said teeth.

25. A coupling for connecting a first object to a second object in a manner resisting translation and rotational displacement therebetween, comprising in combination:
   a first lug having an attached end fixedly attached to the first object and a first mating face,
   a second lug having an attached end fixedly attached to the second object and a second mating face,
   a means to apply a compressive force causing said first face to abut said second face, and
   a plurality of teeth oriented on said first mating face and said second mating face, said teeth spaced from each other by gaps therebetween sized to receive teeth of an opposite said face, said first mating face teeth having a top surface which is adjacent a bottom gap surface between said teeth of said second mating face when said first face abuts said second face and which slopes at a first angle non-parallel to a plane in which said first face abuts said second face and said gaps having said bottom gap surface which slopes at a second angle complemental to said first angle such that said teeth can be located within said gaps when said first face abuts said second face.

26. The coupling of claim 25 wherein said teeth each include two sides, one on either side of said teeth, said sides tapering at an angle nonperpendicular to the plane in which said first face abuts said second face, each said tooth having a width between said two sides which decreases as said tooth extends away from said mating face to which said tooth is attached, such that said teeth exhibit tapered sides facilitating intermeshing of said teeth of one said face within said gaps of an opposite said face.

27. The coupling of claim 26 wherein said teeth exhibit a contour complemental to a contour of said gaps adjacent said teeth and formed in a common said mating face, said teeth of said first face configured similarly to said teeth of said second face.

28. The coupling of claim 27 wherein said teeth are arranged in a circular pattern with said top surface of each said tooth sloping at said first angle such that each said top surface of each said tooth is coplanar with a common point on a polar axis surrounded by said circular pattern of said teeth.

29. The coupling of claim 28 wherein said teeth are truncated at a tip thereof most distant from said gaps, whereby said teeth can securely fit within said gaps after wearing of surfaces of said teeth.

30. The coupling of claim 29 wherein said means to apply a compressive force is a coupling nut connected to said second lug in a manner allowing rotation of said coupling nut relative said second lug, said coupling nut having an inner bore with threads thereon, and said first lug including threads on an exterior thereof complemental to said threads of said inner bore of said coupling nut, whereby said threads of said coupling nut can engage said threads of said exterior surface of said first lug, forcing said coupling nut and said second lug connected thereto toward said first lug.

* * * * *